(12) United States Patent
Fujisawa

(10) Patent No.: US 6,366,485 B1
(45) Date of Patent: Apr. 2, 2002

(54) POWER SOURCE DEVICE, POWER SUPPLYING METHOD, PORTABLE ELECTRONIC EQUIPMENT, AND ELECTRONIC TIMEPIECE

(75) Inventor: Teruhiko Fujisawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/554,775

(22) PCT Filed: Sep. 17, 1999

(86) PCT No.: PCT/JP99/05078

§ 371 Date: Jul. 21, 2000

§ 102(e) Date: Jul. 21, 2000

(87) PCT Pub. No.: WO00/17993

PCT Pub. Date: Mar. 30, 2000

(30) Foreign Application Priority Data

Sep. 17, 1998 (JP) ............................................. 10-263341

(51) Int. Cl.[7] ........................... H02M 7/217; H02M 1/00
(52) U.S. Cl. ........................................ 363/127; 363/147
(58) Field of Search ................................. 363/127, 147, 363/89, 98, 70; 323/223, 224, 358, 282, 266

(56) References Cited

U.S. PATENT DOCUMENTS 4,777,580 A 10/1988 Bingham .................... 363/127
5,510,972 A * 4/1996 Wong ......................... 363/127

FOREIGN PATENT DOCUMENTS

EP 0 052 860 11/1981
JP 8-304568 11/1996

* cited by examiner

*Primary Examiner*—Rajnikant B. Patel

(57) ABSTRACT

An electronic timepiece includes a first diode connected between one terminal to which an alternating-current voltage is supplied and a high-voltage terminal, a second diode connected between the other terminal to which the alternating-current voltage is supplied and the high-voltage terminal, a transistor connected between the one terminal and a low-voltage terminal, and a second transistor connected between the other terminal and the low-voltage terminal. A comparator turns the second transistor off when no forward current flows through the first diode, and turns the first transistor off when no forward current flows through the second diode. A generated alternating-current electromotive force is efficiently rectified and efficiently fed as electric power, while a leakage current is controlled to a minimum when no power is generated or when the electromotive force has a small amplitude.

22 Claims, 11 Drawing Sheets

| STEPUP RATE | CONNECTION | SW1 | SW2 | SW3 | SW4 | SW11 | SW12 | SW13 | SW14 | SW21 |
|---|---|---|---|---|---|---|---|---|---|---|
| TRIPLE | parallel | ON | OFF | ON | OFF | ON | OFF | ON | OFF | OFF |
| TRIPLE | serial | OFF | ON | OFF | OFF | OFF | OFF | ON | ON | ON |
| DOUBLE | parallel | ON | OFF | ON | OFF | ON | OFF | ON | OFF | OFF |
| DOUBLE | serial | OFF | ON | OFF | ON | OFF | ON | OFF | ON | OFF |
| 1.5 TIMES | parallel | ON | OFF | OFF | OFF | OFF | OFF | ON | OFF | ON |
| 1.5 TIMES | serial | OFF | ON | OFF | ON | OFF | ON | OFF | ON | OFF |
| NO STEPUP | parallel | OFF | ON | ON | ON | OFF | ON | ON | ON | OFF |
| NO STEPUP | serial | OFF | ON | OFF | OFF | OFF | OFF | ON | ON | OFF |
| 0.5 TIMES | parallel | ON | OFF | OFF | ON | ON | OFF | ON | OFF | ON |
| 0.5 TIMES | serial | ON | OFF | OFF | ON | OFF | OFF | OFF | ON | OFF |

FIG. 14

POWER SOURCE DEVICE, POWER SUPPLYING METHOD, PORTABLE ELECTRONIC EQUIPMENT, AND ELECTRONIC TIMEPIECE

TECHNICAL FIELD

The present invention relates to a power source device, a power supplying method, and portable electronic equipment and an electronic timepiece, employing the power source device, and, particularly, to a technique for efficiently rectifying generated alternating-current power to supply power while controlling a leakage current under no power generation state.

BACKGROUND ART

With a generator built in, small portable electronic equipment, such as a wristwatch, is always ready to be operative, requiring no troublesome battery replacement. If the power generated by the generator is an alternating-current power, the use of a diode bridge circuit as a rectifier circuit is contemplated. However, since the diode bridge circuit creates a loss due to a voltage drop through two diodes, the diode bridge circuit is not appropriate for use with the generator for the compact portable electronic equipment, i.e., not appropriate as a rectifier for use with the generator that generates a small-amplitude alternating-current voltage.

To cope with this problem, a rectifier circuit has been proposed which includes a transistor which replaces two of the four diodes in use.

When a voltage level at a first terminal of the generator rises above a threshold voltage of a corresponding first transistor during generation in this arrangement, the first transistor is turned on. A current flows through a closed loop of the first terminal→a first diode→a capacitor→a first transistor→a second terminal. As a result, the capacitor is charged.

On the other hand, when a voltage level at a second terminal of the generator rises above a threshold voltage of a corresponding second transistor, the second transistor is turned on, and a current flows through a closed loop of the second terminal→a second diode→the capacitor→the second transistor→the first terminal. As a result, the capacitor is charged.

The alternating-current voltage generated across the terminals of the generator is full-wave rectified, and the loss due to the voltage drop in full-wave rectification corresponds to the loss through a mere single diode. Even when the generator 0 generates a small-amplitude alternating-current voltage, the charged capacitor or the rectified current is directly able to drive a load.

In practice, the first and second diodes suffer from a leakage current, namely, a minimal current flowing in a no power generation state thereof. When the generator is in the inoperative state thereof, or when the electromotive force thereof is small, the voltage across the terminals of the generator shifts from a common voltage, and the first or second transistor fails to be completely turned off.

The voltage across the terminals of the generator in this state is stabilized to a level, through the leakage current, determined by a voltage division ratio of the resistance component of the diode and the resistance component of the transistor that occurs when the transistor is not completely turned off. The transistor is slightly somewhat in an on state due to the stabilized level. The valuable power stored in the capacitor is charged, and is thus consumed in vain.

Since an extremely low current, as low as several hundred nA, is consumed by the compact portable electronic equipment, the effect of a diode leakage current, as high as several tens of nA, is not negligible.

The present invention has been developed with a view to the above problem, and it is an object of the present invention to provide a power source device, a power supplying method, and portable electronic equipment and an electronic timepiece, for efficiently rectifying a generated alternating-current electromotive force to supply power, while controlling a leakage current to a minimum when the generator is in a no power generation state or when the electromotive force is small in amplitude.

DISCLOSURE OF THE INVENTION

A power source device of the present invention, in a first aspect, for supplying power through a first power line and a second power line, includes a first rectifier unit connected to one terminal to which an alternating-current voltage is supplied, and connected to the first power line, a second rectifier unit connected to the other terminal to which the alternating-current voltage is supplied to, and connected to the first power line, a first switching unit connected between the one terminal and the second power line, a second switching unit connected between the other terminal and the second power line, and a control unit which controls the second switching unit to turn the second switching unit off when no forward current flows through the first rectifier unit, and controls the first switching unit to turn the first switching unit off when no forward current flows through the second rectifier unit.

According to the first aspect of the present invention, the first rectifier unit and the second rectifier unit are respectively diodes.

According to the first aspect of the present invention, a leakage current of the diode, as the first rectifier unit, becomes higher than a leakage current when the first switching unit remains turned off, and a leakage current of the diode, as the second rectifier unit, becomes higher than a leakage current when the second switching unit remains turned off.

According to the first aspect of the present invention, each of the diodes, as the first and second rectifier unit, is respectively integrated in a P-type substrate or an N-type substrate, and the first power line remains higher in potential than the second power line when the diodes are integrated in the N-type substrate, and remains lower in potential than the second power line when the diodes are integrated in the P-type substrate.

According to the first aspect of the present invention each of the first and second switching unit is a field-effect transistor.

According to the first aspect of the present invention, a parasitic diode of the field-effect transistor, as the first switching unit, a parasitic diode of the field-effect transistor, as the second switching unit, the first rectifier unit, and the second rectifier unit form a bridge circuit.

According to the first aspect of the present invention, the control unit includes a first control unit for controlling the second switching unit to turn the second switching unit off when no forward current flows through the first rectifier unit, and a second control unit for controlling the first switching unit to turn the first switching unit off when no forward current flows through the second rectifier unit.

According to the first aspect of the present invention, the control unit compares the voltage level based on the one terminal with the voltage level based on the first power line to determine whether a forward current flows through the first rectifier unit, and compares the voltage level based on the other terminal with the voltage level based on the first power line to determine whether a forward current flows through the second rectifier unit.

According to the first aspect of the present invention, the first power line is higher in potential than the second power line, and the control unit determines whether a forward current flows through the first rectifier unit, based on the determination of whether the voltage level at the one terminal rises above the voltage level that is a sum of a predetermined voltage level and the voltage level of the first power line. The control unit also determines whether a forward current flows through the second rectifier unit, based on the determination of whether the voltage level at the other terminal rises above the voltage level that is a sum of a predetermined voltage level and the voltage level of the first power line.

According to the first aspect of the present invention, the first power line is lower in potential than the second power line, and the control unit determines whether a forward current flows through the first rectifier unit, based on the determination of whether the voltage level at the one terminal is lower in potential than the remainder voltage level that is determined by subtracting a predetermined voltage level from the voltage level of the first power line. The control unit also determines whether a forward current flows through the second rectifier unit, based on the determination of whether the voltage level at the other terminal is lower in potential than the remainder voltage level that is determined by subtracting a predetermined voltage level from the voltage level of the first power line.

According to the first aspect of the present invention, the control unit offsets the predetermined voltage level.

According to the first aspect of the present invention, the predetermined voltage level is equal to a forward voltage of the corresponding rectifier unit.

According to the first aspect of the present invention, at least, the first switching unit, the second switching unit, and the control unit are formed in a single semiconductor substrate.

According to the first aspect of the present invention, a power source device includes a storage unit for storing power supplied through the first power line and the second power line, wherein the storage unit supplies power to the control unit.

According to the first aspect of the present invention, a power source device includes a storage unit for storing power supplied through the first power line and the second power line, wherein the output voltage of the storage unit is stepped up and the power stepped up is supplied to the control unit.

According to the first aspect of the present invention, the first power line is set to a common potential.

According to the first aspect of the present invention, a power source device includes an alternating-current generator unit for generating an alternating-current power to supply the alternating-current power.

A power supplying method of the present invention, in a second aspect, of a power source device for supplying power through a first power line and a second power line, which includes a first rectifier unit connected to one terminal to which an alternating-current voltage is supplied, and connected to the first power line, a second rectifier unit connected to the other terminal to which the alternating-current voltage is supplied to, and connected to the first power line, a first switching unit connected between the one terminal and the second power line, and a second switching unit connected between the other terminal and the second power line, wherein the power supplying method controls the second switching unit to turn the second switching off when no forward current flows through the first rectifier unit, and controls the first switching unit to turn the first switching unit off when no forward current flows through the second rectifier unit.

Portable electronic equipment of the present invention, in a third aspect, includes a generator unit for generating an alternating-current voltage between one terminal and the other terminal thereof, a first rectifier unit connected between the one terminal and a first power line, a second rectifier unit connected between the other terminal and the first power line, a first switching unit connected between the one terminal and the second power line, a second switching unit connected between the other terminal and the second power line, a control unit which controls the second switching unit to turn the second switching off when no forward current flows through the first rectifier unit, and controls the first switching unit to turn the first switching unit off when no forward current flows through the second rectifier unit, and a processing unit, operated from power supplied through the first power line and the second power line, for performing a predetermined processing.

An electronic timepiece of the present invention, in a fourth aspect, includes a generator unit for generating an alternating-current voltage between one terminal and the other terminal thereof, a first rectifier unit connected between the one terminal and a first power line, a second rectifier unit connected between the other terminal and the first power line, a first switching unit connected between the one terminal and the second power line, a second switching unit connected between the other terminal and the second power line, a control unit which controls the second switching unit to turn the second switching off when no forward current flows through the first rectifier unit, and controls the first switching unit to turn the first switching unit off when no forward current flows through the second rectifier unit, and a time measurement unit, operated from power supplied through the first power line and the second power line, for measuring time.

BRIEF DESCRIPTION OF THE DRAWINGS

FIG. 14 is a diagram showing the operation of the voltage stepup/stepdown circuit.

BEST MODE FOR CARRYING OUT THE INVENTION

Figure 1:
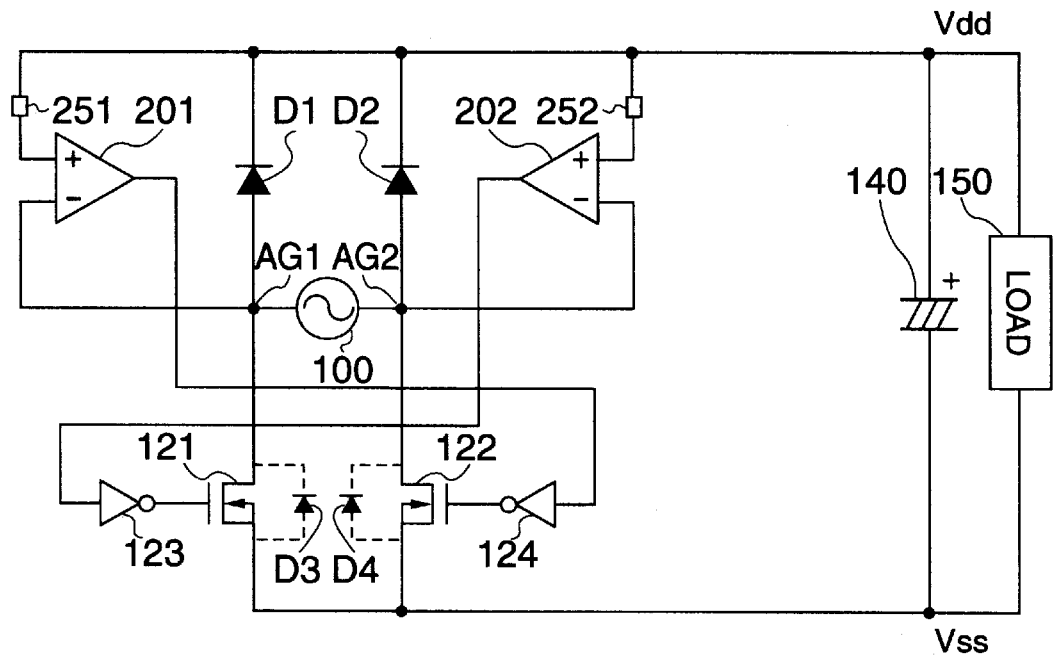
FIG. 1 is a circuit diagram showing the construction of a power source device in accordance with a first embodiment of the present invention.

The embodiments of the present invention are now discussed referring to the drawings.

[1] Construction of a typical power source circuit

Before the discussion of the preferred embodiments of the present invention, for understanding of the invention, a power source device having a rectifier circuit is discussed. The two of four diodes, forming a diode bridge circuit functioning as a rectifier circuit, is here replaced with transistors.

Figure 15:
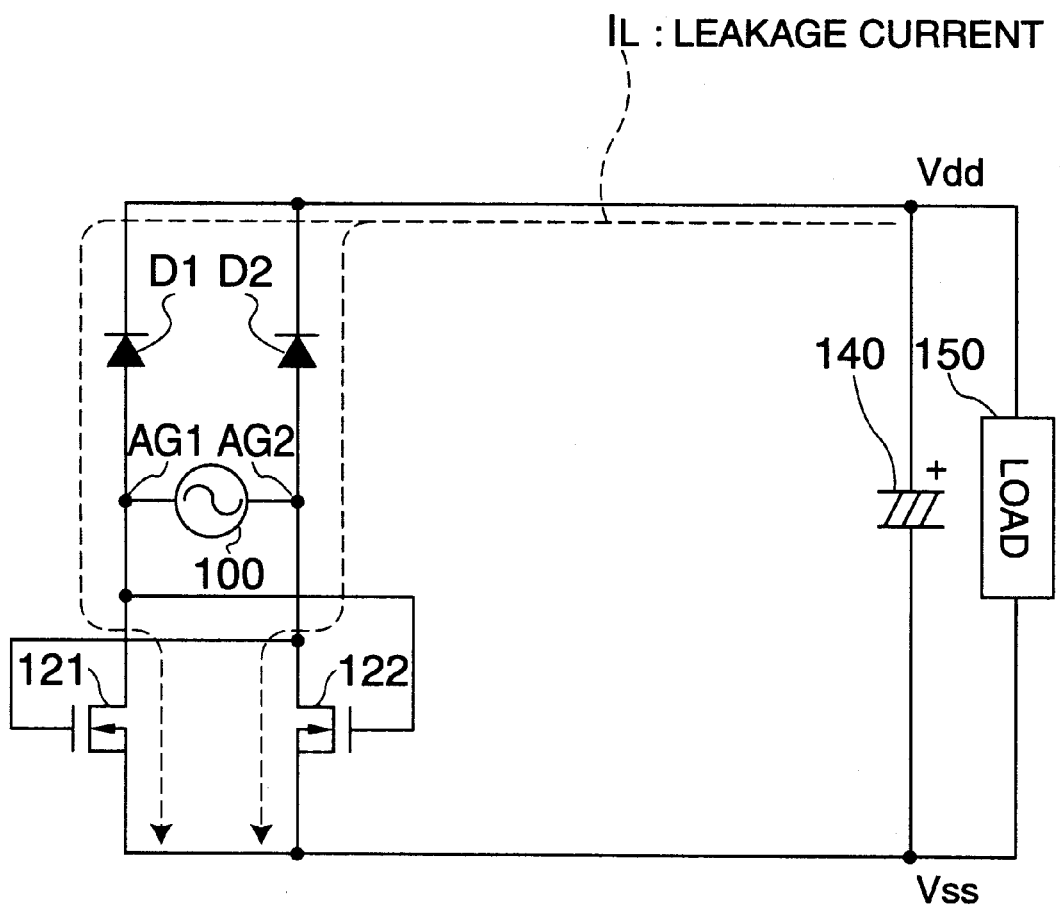
FIG. 15 is a circuit diagram showing the construction of a typical power source device.

FIG. 15 is a circuit diagram of a power source device using a rectifier circuit in which the two of the four diodes forming a diode bridge circuit is replaced with transistors.

As shown, one terminal AG1 of a generator 100 is connected to a high voltage Vdd of a power source via a diode D1, and the other terminal AG2 of the generator 100 is connected to the high voltage Vdd via a diode D2. The terminal AG1 is connected to a low voltage Vss of the power source via an N-channel transistor 121 and the terminal AG2 is connected to the low voltage Vss of the power source via a transistor 122 of the same type. The gate of the transistor 121 is connected to the terminal AG2 and the gate of the transistor 122 is connected to the terminal AG1.

A capacitor 140 is charged with a rectified current, and a load 150, operating from power of the capacitor 140 as the power source thereof, performs a diversity of processings in electronic equipment.

When the voltage level at the terminal AG1 rises above the threshold voltage of the transistor 122 during generation, the transistor 122 is turned on. A current flows in a closed loop of the terminal AG1→the diode D1→the capacitor 140→the transistor 122→the terminal AG2. As a result, the capacitor 140 is charged.

When the voltage level at the terminal AG2 rises above the threshold voltage of the transistor 121, the transistor 121 is turned on. A current flows in a closed loop of the terminal AG2→the diode D2→the capacitor 140→the transistor 121→the terminal AG1. As a result, the capacitor 140 is charged.

The rectified alternating-current power occurring across the terminals AG1 and AG2 is full-wave rectified, and the loss due to a voltage drop in full-wave rectification is that of a mere single diode.

As a result, even the generator 100 generates a small-amplitude alternating-current voltage, the load 150 is driven by the charged capacitor 140 or directly driven by the rectified current.

Leakage currents IL flow, i.e., minimal currents flow through the diodes D1 and D2 as represented by arrow-headed broken lines as shown in FIG. 15.

More specifically, the leakage current IL flows through the diode D1 and the transistor 121 from the high voltage power source (Vdd) to the low voltage power source (Vss) or the leakage current IL flows through the diode D2 and the transistor 122 from the high voltage power source (Vdd) to the low voltage power source (Vss).

When the generator 100 is in a no-power generating state or when the electromotive force thereof has a small amplitude, the voltages at the terminals AG1 and AG2 are shifted from a common voltage, and the transistors 121 and 122 fail to be shifted to a completely turned off state.

The voltage across the terminal AG1 (AG2) of the generator in this state is stabilized to a level, through the leakage current, determined by a voltage division ratio of the resistance component of the diode D1 (D2) and the resistance component of the transistor 121 (122) that occurs when the transistor 121 (122) is not completely turned off. The transistors 121 and 122 are slightly somewhat in an on state due to the stabilized level. The valuable power stored in the capacitor 140 is charged, and is thus consumed in vain.

[2] First embodiment

[2.1] Construction of first embodiment

FIG. 1 is a circuit diagram showing the construction of a power source device of a first embodiment of the present invention.

As shown, the power source device of this embodiment is identical to the construction of the typical power source device shown in FIG. 15 in that the one terminal AG1 and the other terminal AG2, supplied with the alternating-current power by the generator 100, are connected to the high voltage Vdd of the power source, respectively through the diodes D1 and D2.

However, the power source device of the first embodiment is different from the above-referenced power source device in that a transistor 121 for connecting a terminal AG1 to a low voltage Vss of a power source is turned off and on in response to an inverted comparison result of a comparator 202 provided through an inverter 123.

The power source device of the first embodiment is also different from the above-referenced power source device in that a transistor 122 for connecting a terminal AG2 to the low voltage Vss of the power source is turned off and on in response to an inverted comparison result of a comparator 201 provided through an inverter 124.

The comparator 201 in this case has the function of determining whether a forward current flows through the diode D1.

In the first embodiment, the forward current flows through the diode D1 only when the voltage at the terminal AG1 is higher than a voltage level that is a sum of the high voltage Vdd and the forward voltage of the diode D1.

In the first embodiment, a level shifter 251 shifts the high voltage Vdd to a high voltage side by a voltage Voffset1 corresponding to the forward voltage of the diode D1, and the level-shifted voltage is input to a positive input terminal (+) of the comparator 201.

In the first embodiment, the voltage at the terminal AG1 is input to a negative input terminal (−) of the comparator 201.

When the forward current flows through the diode D1, the output signal of the comparator 201 remains at an "L" level.

When no forward current flows through the diode D1, the output signal of the comparator 201 is driven to an "H" level.

The comparator 202 has the function of determining whether a forward current flows through the diode D2, and in the first embodiment, the forward current flows through the diode D1 only when the voltage at the terminal AG2 is higher than a voltage level that is a sum of the high voltage Vdd and the forward voltage of the diode D2.

In the first embodiment, a level shifter 252 shifts the high voltage Vdd to a high voltage side by a voltage Voffset2 corresponding to the forward voltage of the diode D2, and the level-shifted voltage is input to a positive input terminal (+) of the comparator 202.

In the first embodiment, the voltage at the terminal AG2 is input to a negative input terminal (−) of the comparator 202.

When the forward current flows through the diode D2, the output signal of the comparator 202 remains at an "L" level.

When no forward current flows through the diode D2, the output signal of the comparator 202 is driven to an "H" level.

In the first embodiment, the level shifters 251 and 252 are respectively connected to the positive input terminals (+) of the comparators 201 and 202. Alternatively, the level shifters 251 and 252 may be respectively connected to the negative inputs (−) of the comparators 201 and 202.

Specifically, when the level shifters 251 and 252 are respectively arranged on the negative inputs (−) of the comparators 251 and 252, the voltage at the terminal AG1 is shifted to a low voltage side by a voltage Voffset3 corresponding to the forward voltage of the diode D1, and the level-shifted voltage is fed to the negative input terminal (−) of the comparator 201. The voltage at the terminal VG2 is level-shifted to a low voltage side by a voltage Voffset4 corresponding to the forward voltage of the diode D2, and the level-shifted voltage is fed to the negative input terminal (−) of the comparator 202.

In summary, it is sufficient enough if the comparators 201 and 202 determine whether the forward currents respectively flow through the diodes D1 and D2, referring to the forward voltages of the diodes D1 and D2. In this embodiment, the voltage fed to one input of each of the comparators 201 and 202 is shifted. Alternatively, the voltages fed to both inputs of each of the comparators 201 and 202 may be level-shifted.

If the diodes D1 and D2 are of the same type, the forward voltages thereof are substantially equal to each other, and thus, Voffset1=Voffset2 (Voffset3=Voffset4). However, if rectification performance is a concern, Voffset1 (Voffset3), and Voffset2 (Voffset4) are preferably set on an individual basis.

As shown in FIG. 1, the level shifters 251 and 252 are respectively external to the comparators 201 and 202. Alternatively, the level shifter 251 and the comparator 201 are packaged together, and the level shifter 252 and the comparator 202 are packaged together. Furthermore, the transistors 121 and 122 are respectively integrated with the level shifters 251 and 252. Such an integration serves the purpose of compact design.

Figure 2:
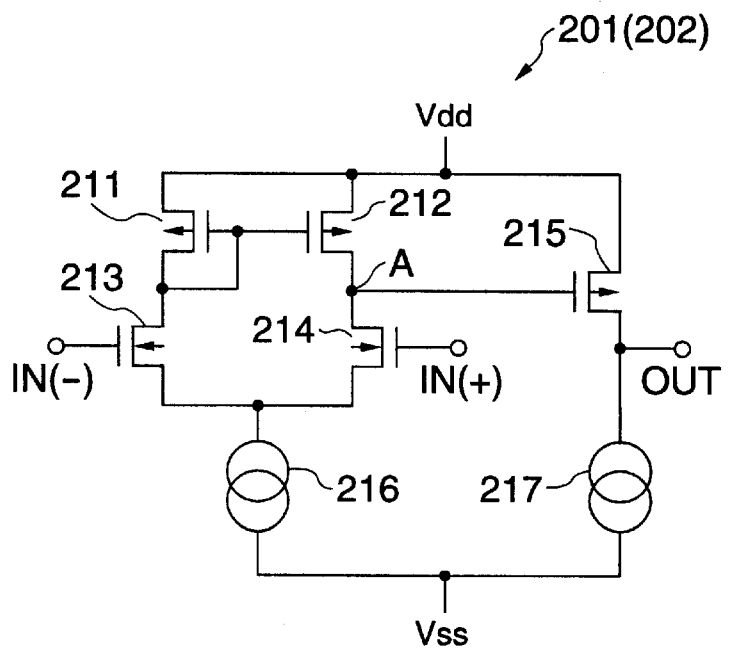
FIG. 2 is a circuit diagram showing one example of a comparator in the first embodiment.

One example of the comparators 201 and 202 is discussed, referring to FIG. 2.

Since the comparator 201 and the comparator 202 have the same construction, the comparator 201 is chiefly discussed.

Referring to FIG. 2, the comparator 201 (202) is composed of a pair of load transistors 211 and 212, a pair of input transistors 213 and 214, an output transistor 215, and constant current sources 216 and 217.

From among the elements of the comparator 201, the load transistors 211 and 212 and the output transistor 215 are P-channel field-effect transistors, and the input transistors 213 and 214 are N-channel transistors.

The gates of the input transistors 213 and 214 respectively serve as the negative input terminal (−) and the positive input terminal (+) of the comparator 201 (202), and the drain of the output transistor 215 serve as an output terminal OUT.

Since the load transistors 211 and 212 function as a current mirror circuit in this construction of the comparator 201, the currents input to the load transistors 211 and 212 are mutually equal.

The input current (voltage) difference between the gates of the input transistors 213 and 214 is amplified and appears at a terminal A. The load transistors 211 and 212 receiving the current difference receives the same current value, and gradually amplify the current (voltage) difference, and then input it to the gate of the transistor 215.

When the voltage at the drain of the transistor 215, i.e., the output terminal OUT of the comparator 201, greatly swings toward the high voltage Vdd if the gate current (voltage) at the gate of the transistor 214, namely, the positive input terminal (+), exceeds even slightly the gate current (voltage) at the gate of the transistor 213, namely, the negative input terminal (−). Conversely, the voltage at the output terminal OUT greatly swings toward the low voltage Vss if the gate current (voltage) at the gate of the transistor 214 remains below the gate current (voltage) at the gate of the transistor 213, namely, the negative input terminal (−).

Since the comparator 201 (202) employs the transistors 211 and 212 as an active load, not even single resistor is used, besides the constant current sources 216 and 217. This feature advantageously serves the purpose of integration.

In the comparators 201 and 202, the voltages are input after being level-shifted by the level shifters 251 and 252. With this arrangement, the threshold voltages Vth of the input transistors 213 and 214 are made different as shown in FIG. 2.

Specifically, if the threshold voltage Vth of the transistor 213 on the negative input terminal (−) is set to be lower than the threshold voltage Vth of the transistor 214 on the positive input terminal (+), the same operation, performed by the level shifters 251 and 252, is performed.

Different threshold voltages Vth of the input transistors 213 and 214 may be achieved by different transistor sizes or by manufacturing process such as impurity implantation.

[2.2] Operation of the first embodiment

Figure 3:
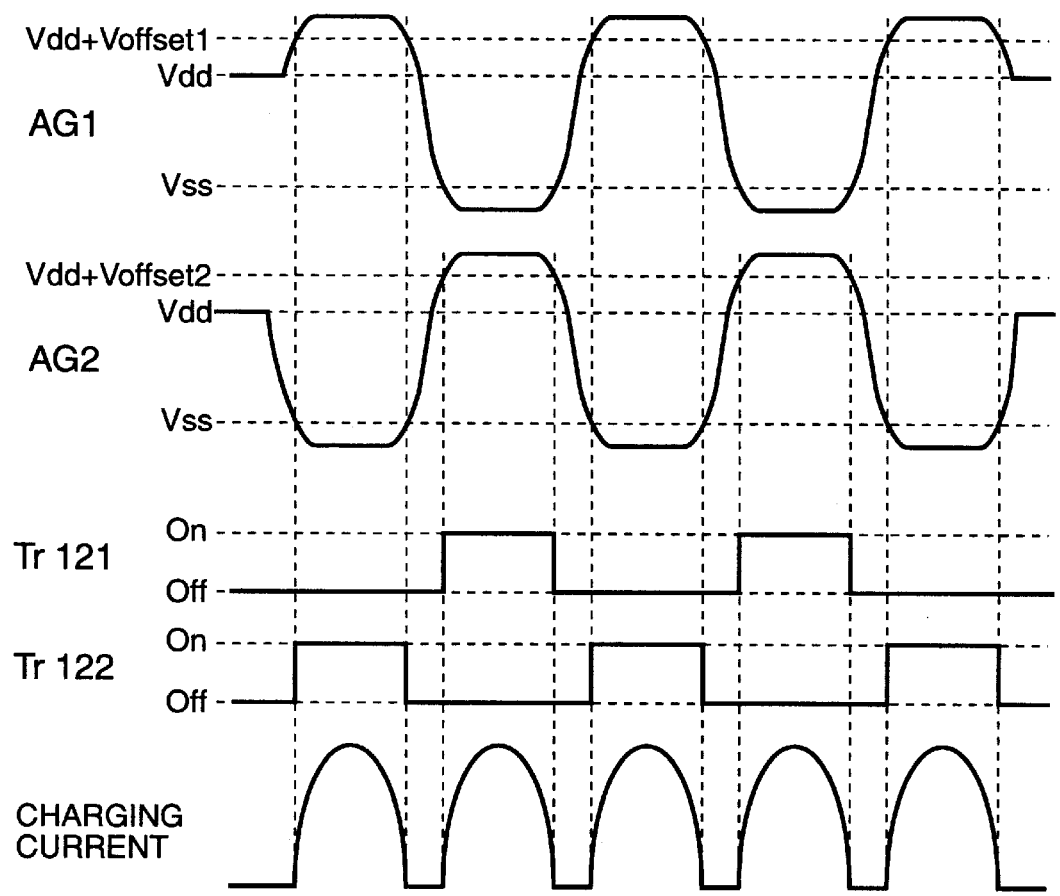
FIG. 3 is a timing diagram illustrating the operation of the power source device of the first embodiment.

The operation of the power source device of the first embodiment is now discussed, referring to FIG. 3.

[2.2.1] Voltage at terminal AG1 higher than voltage (Vdd+Voffset1)

When the voltage at the terminal AG1 is higher than the voltage (Vdd+Voffset1), which is obtained by shifting the high voltage Vdd to a high voltage side by the voltage Voffset1, i.e., when the forward current flows through the diode D1, the output of the comparator 201 is driven to an "L" level. The output of the inverter 124 is driven to an "H" level, causing the transistor 122 to be turned on. The current flows in a closed loop of the terminal AG1→the diode D1→the capacitor 140→the transistor 122→the terminal AG2, thereby charging the capacitor 140.

[2.2.2] Voltage at terminal AG2 higher than voltage (Vdd+Voffset2)

When the voltage at the terminal AG2 is higher than the voltage (Vdd+Voffset2), which is obtained by shifting the high voltage Vdd to a high voltage side by the voltage Voffset2, i.e., when the forward current flows through the diode D2, the output of the comparator 202 is driven to an "L" level. The output of the inverter 123 is driven to an "H" level, causing the transistor 121 to be turned on. The current flows in a closed loop of the terminal AG2→the diode D2→the capacitor 140→the transistor 121→the terminal AG1, thereby charging the capacitor 140.

[2.2.3] Voltage at terminal AG1 lower than voltage (Vdd+Voffset1) and voltage at terminal AG2 lower than voltage (Vdd+Voffset2)

When the voltage at the terminal AG1 is lower than the voltage (Vdd+Voffset1) and the voltage at the terminal AG2 is lower than the voltage (Vdd+Voffset2), i.e., when forward currents flow through neither the diode D1 nor the diode D2, the outputs of the two comparators 201 and 202 are driven to an "H" level. The outputs of the inverters 123 and 124 are driven to an "L" level, completely turning the transistors 121 and 122 off. The closed loop through the capacitor 140 is thus opened, no voltage is charged at the capacitor 140, and discharging through the rectifier circuit is thus blocked.

When the generator 100 is in a no-power generating state, the voltages at the terminals AG1 and AG2 are stabilized to the common voltage Vdd through the leakage currents through the diodes D1 and D2, and in this case, also, the closed loop of the capacitor 140 is thus opened, and no discharging takes place through the rectifier.

[2.2.4] General operation

Figure 4A:
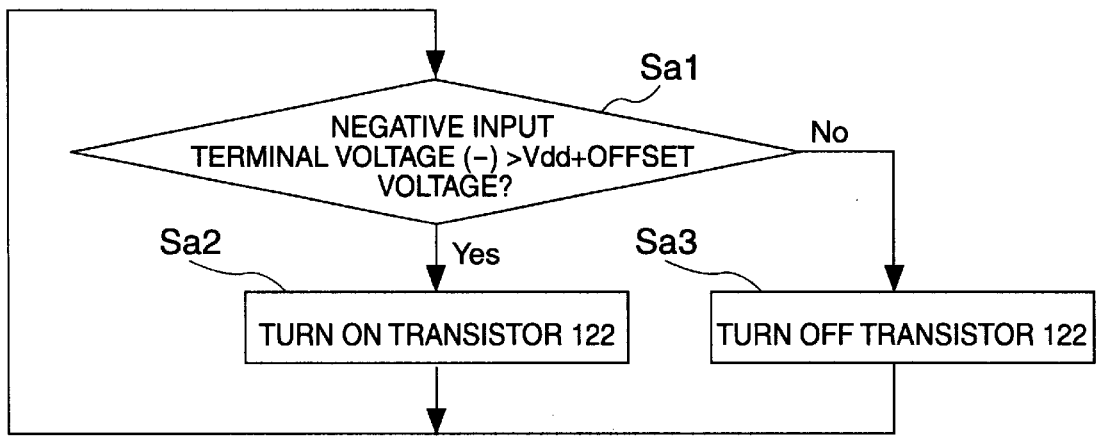
FIG. 4(a) and FIG. 4(b) are flow diagrams illustrating the operation of the power source device of the first embodiment.
Figure 4B:
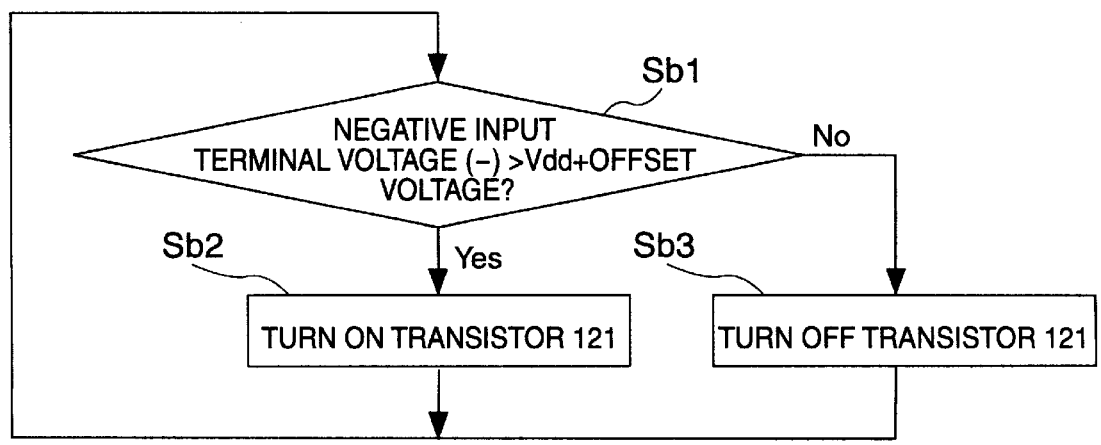

The operation of the device is now discussed referring to a flow diagram shown in FIG. 4. The comparator 201 determines whether the forward current flows through the diode D1, based on the determination of whether the voltage at the negative input terminal (−) is greater in absolute value than the high voltage Vdd +the offset voltage of the comparator (step Sa1).

When it is determined in step Sa1 that the determination result is "Yes", the transistor 122 is turned on (step Sa2).

When it is determined in step Sa1 that the determination result is "No", turning off the transistor 122 is repeated (step Sa3). The comparator 202 determines whether the forward current flows through the diode D2, based on the determination of whether the voltage at the negative input terminal (−) is above the high voltage Vdd+the offset voltage of the comparator (step Sb1).

When it is determined in step Sb1 that the determination result is "Yes", the transistor 121 is turned on (step Sb2).

When it is determined in step Sb1 that the determination result is "No", turning off the transistor 121 is repeated (Sb3).

When no forward currents flow through the diodes D1 and D2 in the power source device of this embodiment, the transistors 121 and 122 are completely turned off, and no currents flow from the terminals AG1 and AG2 to the low voltage Vss.

The leakage currents of the field-effect transistors 121 and 122 during an off state are substantially smaller than the counterparts of the diodes. For this reason, the leakage currents are controlled to a minimum in the power source device of the first embodiment when the generator is in a no-power generating state or the electromotive force has a small amplitude.

The sources of the transistors 121 and 122 are connected to the low voltage Vss, and the drains thereof are connected to a voltage higher than the low voltage Vss. Parasitic diodes D3 and D4 of the transistors 121 and 122 are created in the directions shown by broken lines in FIG. 1. When the comparators 201 and 202 fail to start because of an insufficient storage in the capacitor 140 at a first startup, for instance, it is still possible to allow currents to flow from the sources of the transistors 121 and 122 to the drains thereof.

Even when the voltage generated by the generator 100 is small in amplitude, rectification by a diode bridge composed of the parasitic diodes D3 and D4 and diodes D1 and D2 enables the capacitor 140 to be charged.

When charging currents flow through the parasitic diodes D3 and D4, latchup, characteristic of CMOS LSIs, may take place. However, the latchup is prevented by implementing integral circuit techniques such as a guard band or trench isolation.

[2.3] Modification of the first embodiment

A Schottky diode employing a metal-semiconductor interface suffers from less time delay in the forward to reverse switching than the PN junction diode, and has a smaller forward voltage, and is thus thought of providing a large rectification efficiency.

On the other hand, the Schottky diode presents a large leakage current, and is thus not appropriate for use in a rectifier circuit in a power source device in compact portable electronic equipment.

In the power source device of the first embodiment, the transistors 121 and 122 are completely turned off and the closed loop including the capacitor 140 is opened when no forward currents flow through the diodes D1 and D2.

In this arrangement, Schottky diodes having a large leakage current can satisfactorily work as the diodes D1 and D2.

As a result, a high rectification efficiency results.

[3] Second embodiment

[3.1] Construction of second embodiment

Figure 5:
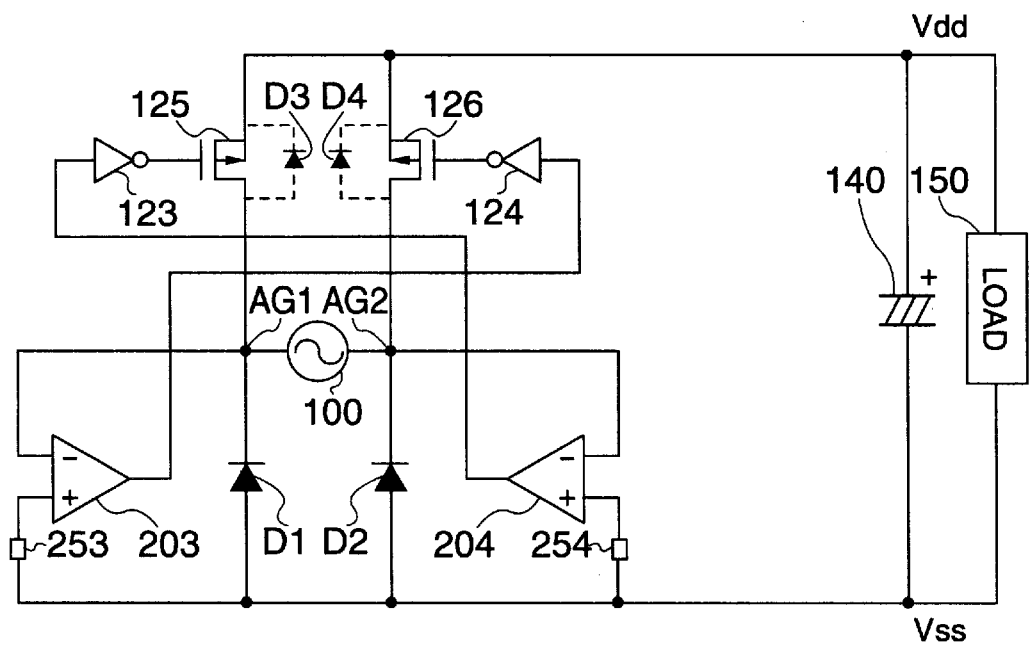
FIG. 5 is a circuit diagram showing a power source device of a second embodiment of the present invention.

A power source device of a second embodiment of the present invention is now discussed, referring to FIG. 5.

In the first embodiment, the diodes D1 and D2 and the comparators 201 and 202 are connected to the high voltage Vdd side and the transistors are connected to the low voltage Vss side.

In the power source device of the second embodiment, in contrast to the arrangement of the first embodiment, the diodes D1 and D2 and comparators 203 and 204 are connected to the low voltage Vss and transistors are connected to the low voltage Vss.

In this embodiment, a transistor 126 for disconnecting the terminal AG2 from the high voltage Vdd when no forward current flows through the diode D1 is a P-channel type, and a transistor 125 for disconnecting the terminal AG1 from the high voltage Vdd when no forward current flows through the diode D2 is also a P-channel type.

The forward current flows through the diode D1 when the voltage at the AG1 is below the voltage that is lower than the low voltage Vss by the voltage Voffset1 corresponding to the forward voltage of the diode D1. In contrast to the first embodiment, a level shifter 253 shifts the low voltage Vss to a low voltage side by the voltage Voffset1.

When the forward current flows through the diode D1, the comparator 203 drives the output signal thereof to an "H" level, causing the transistor 126 to be turned on. When no forward current flows through the diode D1, the comparator 203 drives the output signal thereof to an "L" level, causing the transistor 126 to be completely turned off.

The forward current flows through the diode D2 when the voltage at the AG2 is below the voltage that is lower than the low voltage Vss by the voltage Voffset2 corresponding to the forward voltage of the diode D2. A level shifter 254 shifts the low voltage Vss to a low voltage side by the voltage Voffset2.

When the forward current flows through the diode D2, the comparator 204 drives the output signal thereof to an "H" level, causing the transistor 125 to be turned on. When no forward current flows through the diode D2, the comparator 204 drives the output signal thereof to an "L" level, causing the transistor 125 to be completely turned off.

[3.1.1] Construction of the comparators

Figure 6:
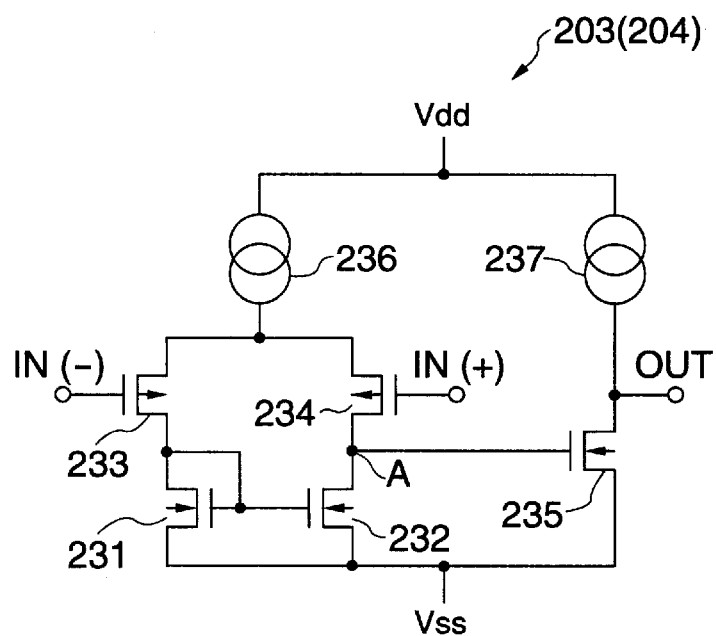
FIG. 6 is a circuit diagram showing one example of a comparator in the second embodiment.

The comparators 203 and 204 connected to the low voltage Vss are now discussed, referring to FIG. 6.

As shown, the comparator 203 (204) includes a pair of load transistors 231 and 232, a pair of input transistors 233 and 234, an output transistor 235, and constant current sources 236 and 237. The load transistors 231 and 232 and the output transistor 235 are N-channel transistors, while the input transistors 233 and 234 are P-channel transistors. The gates of the input transistors 233 and 234 respectively serve as a negative input terminal (−) and a positive input terminal (+) of the comparator 203 (204), while the source of the output transistor 235 serves as an output terminal OUT.

The comparator 203 (204) is configured in a polarity arrangement opposite to that in the comparator 201 (202) connected to the high voltage Vdd (see FIG. 2).

[3.1.2] Operation

Figure 7A:
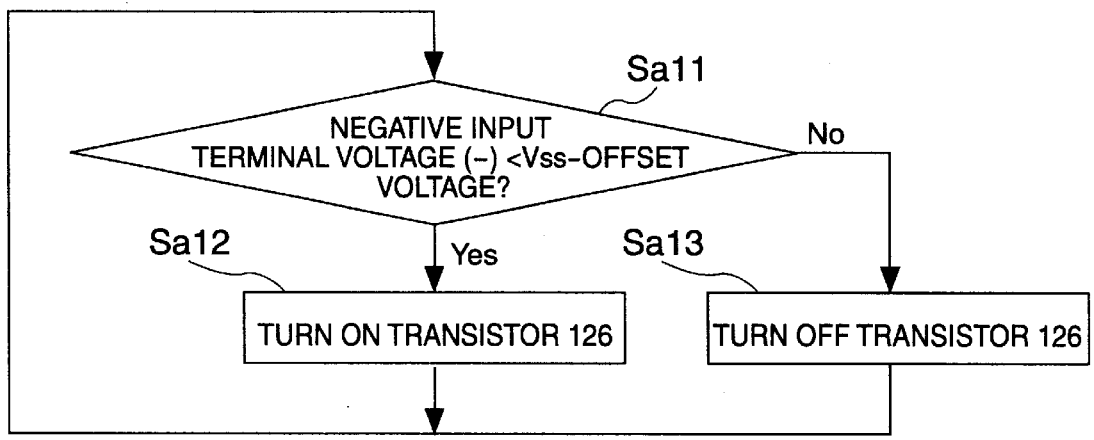
FIG. 7(a) and FIG. 7(b) are flow diagrams illustrating the operation of the power source device of the second embodiment.
Figure 7B:
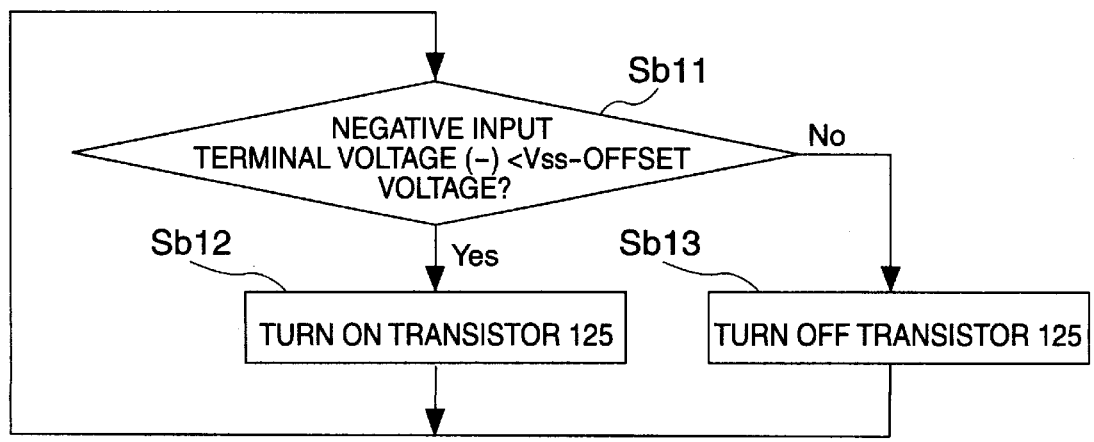

The operation of the comparators is now discussed, referring to FIG. 7.

FIG. 7 shows an operational flow diagram of the comparators.

The comparator 203 determines whether the forward current flows through the diode D1, based on the determination of whether the voltage at the negative input terminal (−) is smaller in absolute value than the low voltage Vss—the offset voltage of the comparator (step Sa11).

When the answer in step Sa11 is "Yes", the transistor 126 is turned on (step Sa12).

When the answer in step Sa11 is "No", turning off the transistor 126 is repeated (step Sa13). The comparator 204 determines whether the forward current flows through the diode D2, based on the determination of whether the voltage at the negative input terminal (−) is above the low voltage Vss—the offset voltage of the comparator (step Sb11).

When the answer in step Sb11 is "Yes", the transistor 125 is turned on (step Sb12).

When the answer in step Sb11 is "No", turning off the transistor 125 is repeated (step Sb13).

When no forward currents flow through the diodes D1 and D2 in the power source device of the second embodiment, the transistors 126 and 125 are completely turned off, and no currents flow from the terminals AG1 and AG2 to the low voltage Vss.

The leakage currents of the field-effect transistors 125 and 126 during an off state are substantially smaller than those of the diodes. For this reason, as in the first embodiment, the power source device of the second embodiment controls the leakage currents to a minimum when the generator 100 is in a no-power generating state or the electromotive force is small in amplitude.

Since the sources of the transistors 125 and 126 are connected to the low voltage Vss with the drains thereof connected to a voltage higher than the low voltage Vss, parasitic diodes D3 and D4 of the transistors 125 and 126 are created in the directions represented by broken lines as shown in FIG. 5. When the comparators 203 and 204 fail to start because of an insufficient storage in the capacitor 140 at a first startup, for instance, it is still possible to allow currents to flow from the sources of the transistors 125 and 126 to the drains thereof.

Even when the voltage generated by the generator 100 is small in amplitude, rectification by a diode bridge composed of the parasitic diodes D3 and D4 and diodes D1 and D2 enables the capacitor 140 to be charged.

When charging currents flow through the parasitic diodes D3 and D4, latchup, characteristic of CMOS LSIs, may take place. However, the latchup is prevented by implementing integral circuit techniques such as a guard band or trench isolation.

The rest of the operation of the second embodiment remains unchanged from that of the first embodiment. The advantages of the second embodiment also remain identical to t hose of the first embodiment.

[4] Third embodiment

[4.1] Construction of third embodiment

Figure 8:
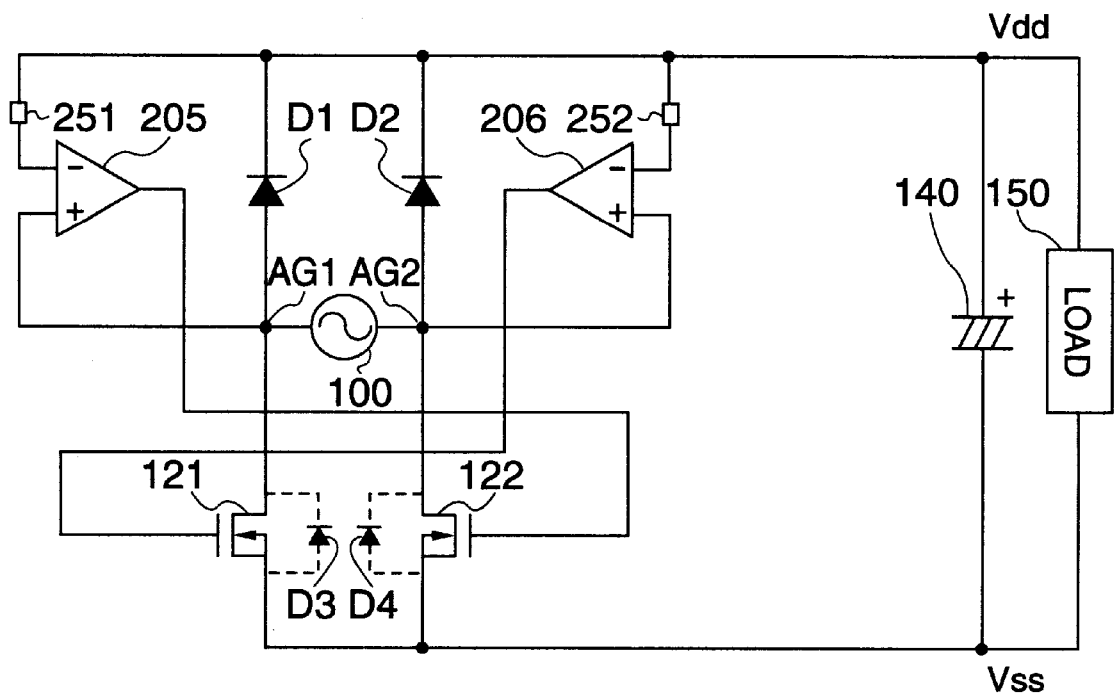
FIG. 8 is a circuit diagram showing a power source device of a third embodiment of the present invention.

The construction of the power source device of a third embodiment is now discussed, referring to FIG. 8.

In the first embodiment, the outputs of the comparators 201 and 202 are respectively inverted through the inverters 123 and 124.

In contrast, the power source device of the third embodiment dispenses with the inverters 123 and 124 by reversing the inputs of each comparator.

Specifically, as shown in FIG. 8, the voltage at the terminal AG1 is input to the positive input terminal (+) of the comparator 205 and the voltage, the level of which is shifted from the high voltage Vdd by the voltage Voffset1 through the level shifter 251, is fed to the negative input terminal (−).

When the forward current flows through the diode D1, the comparator 205 drives the output signal thereof to an "L" level, thereby turning the transistor 122 on.

When no forward current flows through the diode D1, the comparator 205 drives the output signal thereof to an "H" level, thereby completely turning the transistor 122 on.

Similarly, the voltage at the AG2 is fed to the positive input terminal (+) of the comparator 206.

The negative input terminal (−) of the comparator 206 is supplied with the voltage, the level of which is shifted from the high voltage Vdd to a high voltage side by the voltage Voffset2 by the level shifter 252.

When the forward current flows through the diode D2, the comparator 206 drives the output signal thereof to an "L" level, thereby turning the transistor 121 on. When no forward current flows through the diode D2, the comparator 206 drives the output signal thereof to an "H" level, thereby completely turning the transistor 121 off.

With the inverters eliminated, the third embodiment has a simple construction.

By reversing the inputs of each of the comparators 203 and 204, the second embodiment also dispenses with the inverters 123 and 124.

[5] Integration of the diodes D1 and D2

In each of the preceding embodiments, the transistors 121 and 122 (125 and 126), the comparators 201 and 202 (203 and 204, or 205 and 206), the level shifters 251 and 252 (253 and 254), and the inverters 123 and 124 (except the third embodiment) can be integrated. If the diodes D1 and D2 are also integrated together, the size of the circuit is reduced, and cost reduction is thus achieved.

When integrated together, the diodes D1 and D2 may fail to properly function depending on conditions. such problems are now studied.

Figure 9:
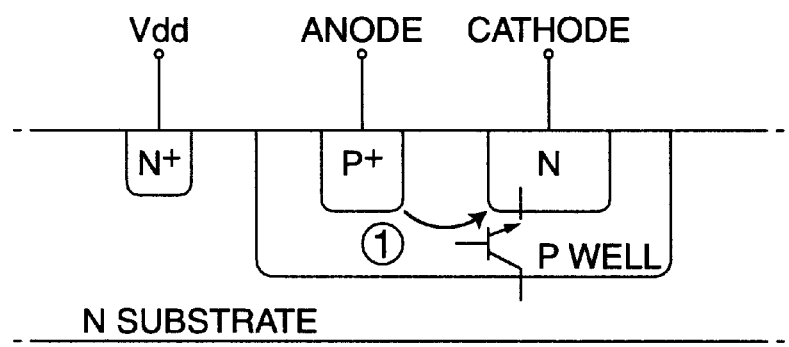
FIG. 9 is a cross-sectional view showing a diode formed in an N-type substrate.

When a substrate into which the elements are integrated is an N-type, diodes are typically formed as shown in FIG. 9. The forward current thus flows in the direction represented by (1).

If the N-type substrate is considered, however, an NPN-type bipolar transistor is parasitically formed as shown. If the forward current flows as shown in the direction represented by (1), this current may function as a trigger to turn the bipolar transistor on.

Figure 10:
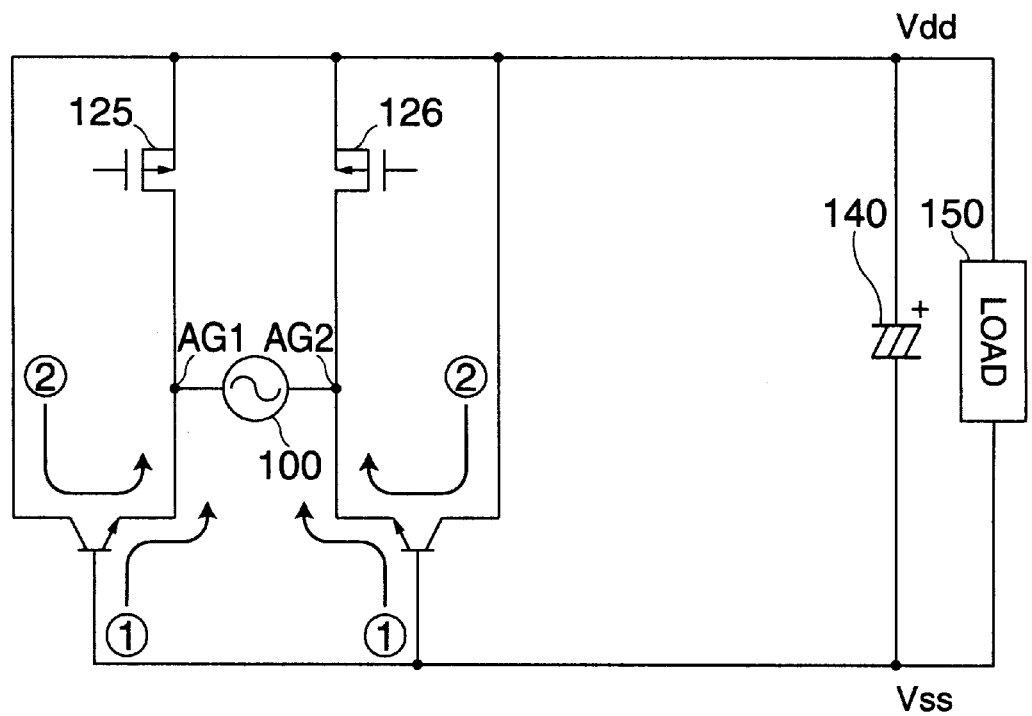
FIG. 10 is a circuit diagram showing diodes D1 and D2, which work as parasitic bipolar transistors.

If the diodes D1 and D2, integrated in the N-type substrate, are connected to the low voltage Vss, the diodes D1 and D2 become parasitic bipolar NPN transistors as shown in FIG. 10.

If the forward current flows in the direction represented by (1) under this condition, collector currents flow as represented by (2), shorting the high voltage Vdd to the terminal AG1 or the terminal AG2. As a result, rectification can fail to properly function.

When the N-type substrate is employed, the diodes D1 and D2 are preferably connected to the high voltage Vdd as in the first embodiment shown in FIG. 1 so that no parasitic NPN-type bipolar transistors are constructed.

Conversely, when the P-type substrate is employed, the diodes D1 and D2 are preferably connected to the low voltage Vss as in the second embodiment shown in FIG. 5 so that no parasitic PNP transistors are constructed.

[6] Electronic timepiece

Discussed next is an electronic timepiece (wristwatch) as one example of electronic equipment in which the power source device of the present invention is incorporated.

[6.1] General construction of the electronic timepiece

Figure 11:
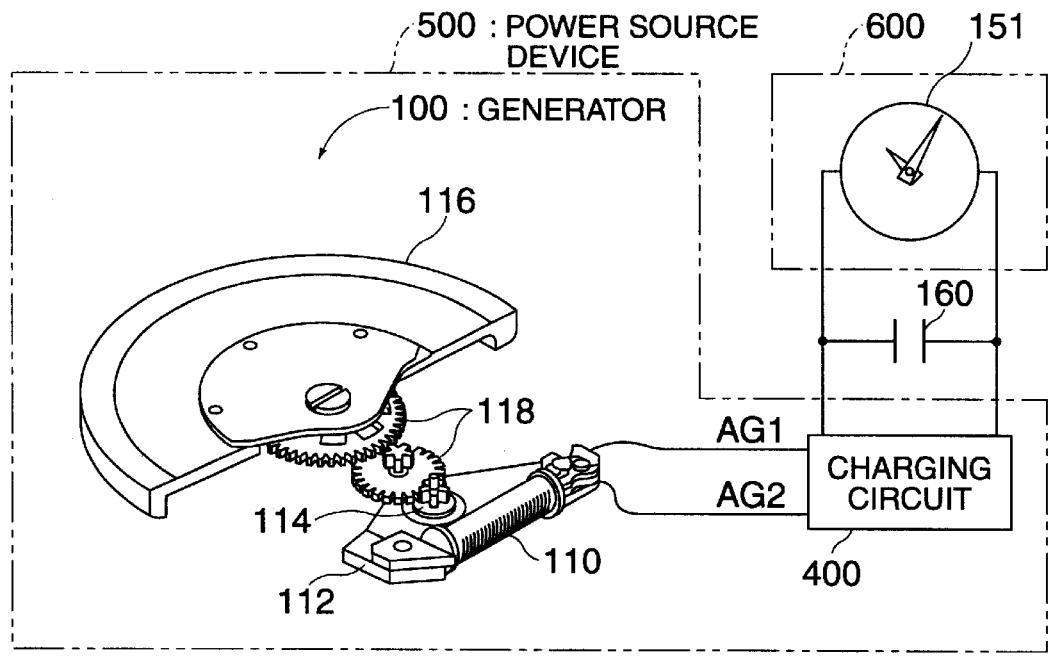
FIG. 11 is a general block diagram showing an electronic timepiece in which the power source device of each of the embodiments of the present invention is incorporated.

FIG. 11 shows the general construction of an electronic timepiece.

As shown, a generator 100 appropriate for use in a wristwatch includes a stator 112 around which a coil 110 is wound, and a disklike rotor 114 magnetized in two poles. When the user wearing the wristwatch moves his or her hand, an oscillating weight 116 turns. As the oscillating weight 116 turns, the turn motion thereof is transmitted through a train wheel mechanism 118 to turn the rotor 114. The generator 100 generates alternating-current power across the terminals AG1 and AG2 at both ends of the coil 110 as the oscillating weight 116 turns.

The alternating-current power generated by the generator 100 is full-wave rectified through a charging circuit 400, and charges a capacitor 160 while being supplied to a processing unit 600.

Operated from power charged in the capacitor 160 or power full-wave rectified through a power source device 500, the processing unit 600 drives a time measurement device 151. The time measurement device 151 is composed of a crystal oscillator, a counter circuit, a stepping motor, etc. A clock signal generated by the crystal oscillator is frequency divided through the counter circuit. Based on the frequency division result, the time measurement device 151 measures time while driving the stepping motor to display time.

[6.2] Electrical construction of the electronic timepiece

Figure 12:
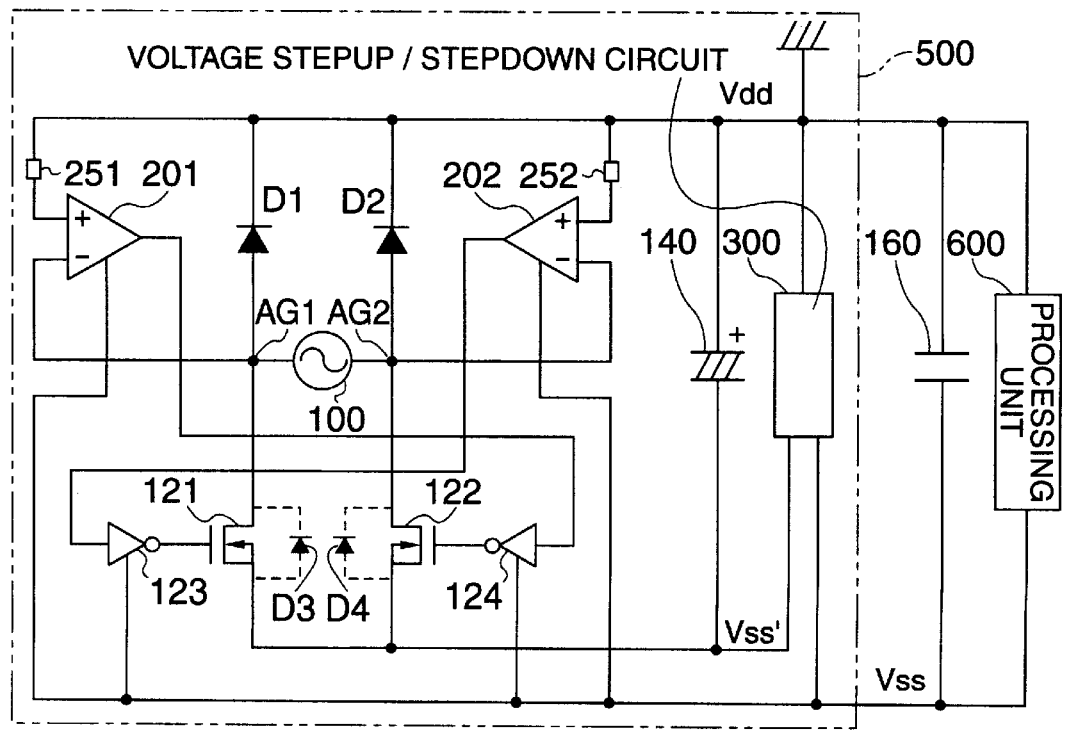
FIG. 12 is a block diagram showing the construction of the electronic timepiece.

FIG. 12 is a block diagram showing the electrical construction of the electronic timepiece.

As shown, the electronic timepiece employs the power source device of the first embodiment. The power source device 500 of this electronic timepiece further includes a voltage stepup and stepdown circuit 300.

The voltage stepup and stepdown circuit 300 steps up voltage charged in the capacitor 140 as necessary to charge the capacitor 160, and then feeds power to the load of the electronic timepiece, namely, including the processing unit 600, the inverters 123 and 124, the comparators 201 and 202, etc. Specifically, the voltage stepup and stepdown circuit 300 increases a voltage stepup rate by one notch when a power source voltage, i.e., a line voltage (absolute value) between the low voltage Vss as a common potential and the high voltage Vdd, drops below a lower limit value (or close to the lower limit value) that enables circuits to operate there from. The voltage stepup and stepdown circuit 300 decreases the voltage stepup rate by one notch when the line voltage rises above an upper limit value (or close to the upper limit value).

The voltage stepup and stepdown circuit 300 is discussed in detail.

Figure 13:
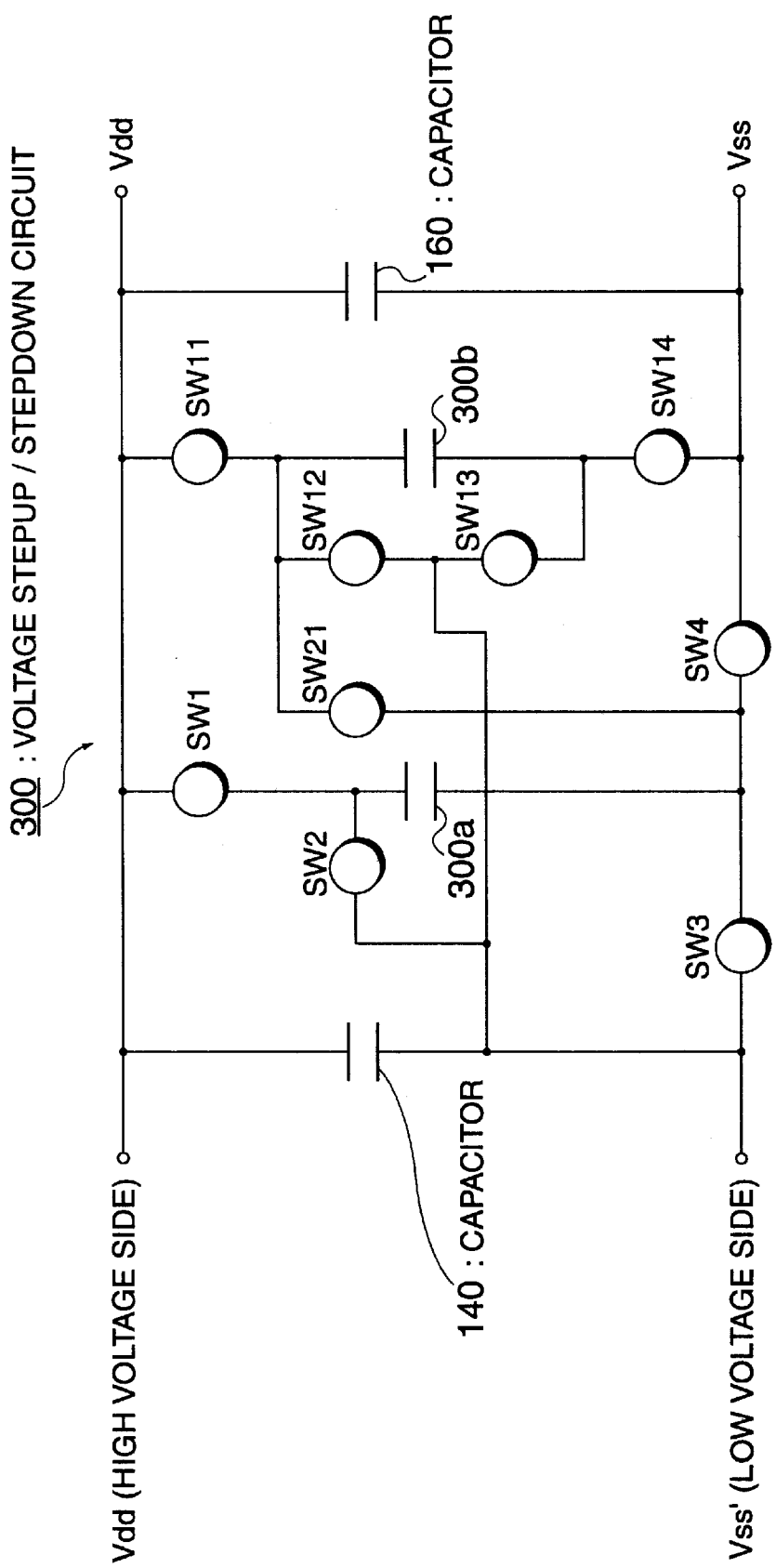
FIG. 13 is a block diagram showing voltage stepup/stepdown circuit.

As show n in FIG. 13, the voltage stepup and stepdown circuit 300 includes a switch SW1, one terminal of which is connected to a high-voltage terminal of the capacitor 140, a switch SW2, one terminal of which is connected to the other terminal of the switch SW1, and the other terminal of which is connected to a low-voltage terminal of a high-capacitance, secondary power source 48, a capacitor 300a, one terminal of which is connected to the junction of the switch SW11 and switch SW2, a switch SW3, one terminal of which is connected to the other terminal of the capacitor 300a, and the other terminal of which is connected to the low-voltage terminal of the capacitor 140, a switch SW4, one terminal of which is connected to a low-voltage terminal of the capacitor 160, and the other terminal of which is connected to the junction of the capacitor 300a and the switch SW3, a switch SW11, one terminal of which is connected to the junction of the high-voltage terminal of the capacitor 140 and a high-voltage terminal of the capacitor 160, a switch SW12, one terminal of which is connected to the other terminal of the switch SW11, and the other terminal of which is connected to the low-voltage terminal of the capacitor 140, a capacitor 300b, one terminal of which is connected to the junction of the switch S11 and the switch SW12, a switch SW13, one terminal of which is connected to the other terminal of the capacitor 300b, and the other terminal of which is connected to the junction of the switch SW12 and the low-voltage terminal of the capacitor 140, a switch SW14, one terminal of which is connected to the junction of the capacitor 300b and the switch SW13, and the other terminal of which is connected to the low-voltage terminal of the capacitor 160, and a switch SW21, one terminal of which is connected to the junction of the switch SW11 and the switch SW12, and the other terminal of which is connected to the junction of the capacitor 300a and the switch SW3.

Arranged as peripheral circuits around the voltage stepup and stepdown circuit 300 in this case are a voltage detector circuit for detecting a power source voltage, and a control circuit for controlling the voltage stepup and stepdown operation in response to the detection result provided by the voltage detector circuit.

The control circuit switches the voltage stepup rate in accordance with the power source voltage detected by the voltage detector circuit.

The voltage stepup and stepdown circuit 300 operates in response to stepup/stepdown clock KUD generated by a reference clock generator circuit external thereto.

The operation of the voltage stepup and stepdown circuit 300 during a voltage tripling operation is discussed, referring to FIG. 14.

The voltage stepup and stepdown circuit 300 operates in response to the externally supplied stepup/stepdown clock KUD. As shown in FIG. 14, during the voltage tripling operation, the switch SW1 is turned on, the switch SW2 is turned off, the switch SW3 is turned on, the switch SW4 is turned off, the switch SW11 is turned on, the switch SW12 is turned off, the switch SW13 is turned on, the switch SW14 is turned off, and the switch SW21 is turned off at a first voltage stepup timing (a parallel connection timing).

In this case, in the voltage stepup and stepdown circuit 300, the capacitor 300a and the capacitor 300b are supplied with power from the capacitor 140. The capacitors 300a and 300b are charged until the voltage of each of the capacitors 300a and 300b is substantially equal to that of the capacitor 140.

At a second voltage stepup timing (a serial connection timing), the switch SW1 is turned off, the switch SW2 is turned on, the switch SW3 is turned off, the switch SW4 is turned off, the switch SW11 is turned off, the switch SW12 is turned off, the switch SW13 is turned off, the switch SW14 is turned on, and the switch SW21 is turned on.

In this case, in the voltage stepup and stepdown circuit 300, the capacitor 140, and the capacitors 300a and 300b are connected in series, and the capacitor 160 is charged with the voltage three times the voltage of the capacitor 140. Voltage tripling is thus performed.

Similarly, a voltage doubling operation, a voltage stepup operation for 1.5 times the original voltage, no voltage stepup operation (original input voltage), and a voltage stepdown operation to half the original voltage are performed.

With the voltage stepup and stepdown circuit 300 incorporated, the power source voltage Vss is maintained to within a range of operation enable voltage even when the charging of the capacitor 140 is insufficient.

The comparators 201 and 202 can thus control the transistors 121 and 122, allowing a small-amplitude alternating-current voltage to be rectified.

The driving capability of the inverters 123 and 124 feeding the gate voltages to the transistors 121 and 121 is enhanced, reducing the on resistance of the transistors 121 and 122, and leading to a high rectification efficiency.

As already discussed, even when the comparators 201 and 202 fail to be operative with the capacitor 140 insufficiently charged, the capacitor 140 is then sufficiently charged through rectification carried out by the diode bridge composed of the parasitic diodes D3 and D4 and the diodes D1 and D2.

The reason why the electronic timepiece incorporates the power source device of the first embodiment is as follows. In the electronic timepiece, the common voltage is the high voltage Vdd. To obtain a voltage Vss of –1.5 V, a voltage Vss' of –0.5 V is required with a voltage stepup rate of 3 for the voltage stepup and stepdown circuit 300. If the power source device of the second embodiment is employed as a power source device for the electronic timepiece, –0.5 V is fed as Vss' to the input of the comparator 203 (204) (after being level shifted in FIG. 5).

Since transistors for use in the timepiece typically have a threshold voltage Vth of 0.6 V or, the constant current source 236 (see FIG. 6) is set into a non-saturated state. For this reason, no sufficient current flows therethrough, and the comparator is unable to normally perform a comparison operation. In contrast, the power source device of the first embodiment feeds the high voltage Vdd as a common voltage to the input of the comparator (after being level shifted in FIG. 1), and is stable in circuit operation. The power source device of the first embodiment is thus preferable.

In contrast, when the low voltage Vss is used as a common voltage in the above electronic timepiece, the use of the power source device of the second embodiment is preferable.

[7] Modifications of the embodiments
[7.1] First modification

In the electronic timepiecees of the first, second and third embodiments, the transistors 121, 122, 125, and 126 are N-channel field-effect transistors or P-channel field-effect transistors. Alternatively, NPN-type or PNP-type bipolar transistors may be used. The bipolar transistors typically have a saturation voltage of approximately 0.3 V between the emitter and the collector. The field-effect transistors are preferable when the electromotive force of the generator 100 is small.

[7.2] Second modification

In the electronic timepiecees of the first, second and third embodiments, a major component for charging power is the capacitor 140. Any component is acceptable as long as it stores power. For instance, a secondary battery may be employed.

[7.3] Third modification

Besides the one shown in FIG. 10, the generator 100 may be a type which creates a rotary motion using a restoring force of a mainspring and generates an electromotive force from the rotary motion, or may be a type which makes use of the piezoelectric effect for power generation by exerting a vibration or displacement to a piezoelectric material externally or in a self-driving fashion. It is important that the generator 100 generate an alternating-current voltage, and the form of the generator 100 is not important.

[7.4] Fourth modification

Besides the electronic timepiece, electronic equipment in which the power source device of the above embodiments is incorporated may be a liquid-crystal television set, a video cassette recorder, a notebook personal computer, a portable telephone, a PDA (Personal Digital Assistant), or an electronic calculator. The power source device of the present invention may find applications in any type of electronic equipment as long as it consumes electric power. In such electronic equipment, electrical circuits and a mechanical system are operated from power fed by the generator rather than from a primary battery. The electronic equipment is operative any time anywhere, is free from a troublesome battery replacement, and creates no problems relating to battery disposal.

[7.5] Fifth modification

In the above discussion, the electronic equipment includes the generator. Even portable equipment having no generator therewithin is supplied with power from an external alternating-current power source (a utility power line, for instance), rectifies the power through the above-reference rectifier, and stores the power in a storage unit (a capacitor or a secondary battery).

In this case, unnecessary power consumption due to the leakage current during no rectification period is controlled, and a low power consumption design is thus implemented.

[8] Advantages of the embodiments

As described above, in accordance with the above-referenced embodiments, the control unit turns off the second switching unit when no forward current flows through the first rectifier unit, and turns off the first switching unit when no forward current flows through the second rectifier unit.

When forward currents flow through neither the first rectifier unit nor the second rectifier unit, i.e., no rectification is performed, both the first switching unit and the second switching unit are turned off and both closed loops are opened. Power consumption due to the leakage currents through the first rectifier unit and the second rectifier unit is thus controlled, and a low power consumption design is thus implemented.

In accordance with the above-referenced embodiments, integration of the blocks including the first rectifier unit and the second rectifier unit is easy, and miniaturization of circuit scale is possible. In the electronic equipment such as a wristwatch, subject to space limitation, available space is effectively used. The integration of the blocks reduces manufacturing costs.

What is claimed is:

1. A power source device for supplying power through a first power line and a second power line, comprising:
 a first rectifier connected to one terminal to which an alternating-current voltage is supplied, and connected to the first power line,
 a second rectifier connected to the other terminal to which the alternating-current voltage is supplied to, and connected to the first power line, a first switch connected between the one terminal and the second power line, a second switch connected between the other terminal and the second power line, and a controller which controls the second switch to turn the second switch off when no forward current flows through the first rectifier, and controls the first switch to turn the first switch off when no forward current flows through the second rectifier.

2. A power source device according to claim 1, wherein the first rectifier and the second rectifier are respectively diodes.

3. A power source device according to claim 2, wherein a leakage current of the diode, as the first rectifier, becomes higher than a leakage current when the first switch remains turned off, and a leakage current of the diode, as the second rectifier, becomes higher than a leakage current when the second switch remains turned off.

4. A power source device according to claim 2, wherein each of the diodes, as the first and second rectifier, is respectively integrated in a P-type substrate or an N-type substrate, and wherein the first power line remains higher in potential than the second power line when the diodes are integrated in the N-type substrate, and remains lower in potential than the second power line when the diodes are integrated in the P-type substrate.

5. A power source device according to claim 1, wherein each of the first and second switches is a field-effect transistor.

6. A power source device according to claim 5, wherein a parasitic diode of the field-effect transistor, as the first switch, a parasitic diode of the field-effect transistor, as the second switch, the first rectifier, and the second rectifier form a bridge circuit.

7. A power source device according to claim 1, wherein the controller comprises:

a first controller for controlling the second switch to turn the second switch off when no forward current flows through the first rectifier, and a second controller for controlling the first switch to turn the first switch off when no forward current flows through the second rectifier.

8. A power source device according to claim 1, wherein the controller compares the voltage level based on the one terminal with the voltage level based on the first power line to determine whether a forward current flows through the first rectifier, and compares the voltage level based on the other terminal with the voltage level based on the first power line to determine whether a forward current flows through the second rectifier.

9. A power source device according to claim 8, wherein the first power line is higher in potential than the second power line, and wherein the controller determines whether a forward current flows through the first rectifier, based on the determination of whether the voltage level at the one terminal rises above the voltage level that is a sum of a predetermined voltage level and the voltage level of the first power line, and determines whether a forward current flows through the second rectifier, based on the determination of whether the voltage level at the other terminal rises above the voltage level that is a sum of a predetermined voltage level and the voltage level of the first power line.

10. A power source device according to claim 8, wherein the first power line is lower in potential than the second power line, and wherein the controller determines whether a forward current flows through the first rectifier, based on the determination of whether the voltage level at the one terminal is lower in potential than the remainder voltage level that is determined by subtracting a predetermined voltage level from the voltage level of the first power line, and determines whether a forward current flows through the second rectifier, based on the determination of whether the voltage level at the other terminal is lower in potential than the remainder voltage level that is determined by subtracting a predetermined voltage level from the voltage level of the first power line.

11. A power source device according to claim 9, wherein the controller offsets the predetermined voltage level.

12. A power source device according to claim 11, wherein the predetermined voltage level is equal to a forward voltage of the corresponding rectifier.

13. A power source device according to claim 1, wherein, at least, the first switch, the second switch, and the controller are formed in a single semiconductor substrate.

14. A power source device according to claim 1, comprising a storage device for storing power supplied through the first power line and the second power line, wherein the storage device supplies power to the controller.

15. A power source device according to claim 1, comprising a storage device for storing power supplied through the first power line and the second power line, wherein the output voltage of the storage device is boosted and the power boosted is supplied to the controller.

16. A power source device according to claim 15, wherein the first power line is set to a common potential.

17. A power source device according to claim 1, comprising an alternating-current generator for generating an alternating-current power to supply the alternating-current power.

18. A power supplying method of a power source device for supplying power through a first power line and a second power line, the power source device comprising:

a first rectifier connected to one terminal to which an alternating-current voltage is supplied, and connected to the first power line, a second rectifier connected to the other terminal to which the alternating-current voltage is supplied to, and connected to the first power line, a first switch connected between the one terminal and the second power line, and a second switch connected between the other terminal and the second power line, wherein the power supplying method controls the second switch to turn the second switch off when no forward current flows through the first rectifier, and controls the first switch to turn the first switch off when no forward current flows through the second rectifier.

19. Portable electronic equipment comprising:

a generator for generating an alternating-current voltage between one terminal and the other terminal thereof, a first rectifier connected between the one terminal and a first power line, a second rectifier connected between the other terminal and the first power line, a first switch connected between the one terminal and a second power line, a second switch connected between the other terminal and the second power line, a controller which controls the second switch to turn the second switch off when no forward current flows through the first rectifier, and controls the first switch to turn the first switch off when no forward current flows through the second rectifier, and a processor, operated from power supplied through the first power line and the second power line, for performing a predetermined processing.

20. An electronic timepiece comprising:

a generator for generating an alternating-current voltage between one terminal and the other terminal thereof, a first rectifier connected between the one terminal and a first power line, a second rectifier connected between the other terminal and the first power line, a first switch connected between the one terminal and a second power line, a second switch connected between the other terminal and the second power line, a controller which controls the second switch to turn the second switch off when no forward current flows through the first rectifier, and controls the first switch to turn the first switch off when no forward current flows through the second rectifier, and a time measurement device, operated from power supplied through the first power line and the second power line, for measuring time.

21. A power source device according to claim 10, wherein the controller offsets the predetermined voltage level.

22. A power source device according to claim 21, wherein the predetermined voltage level is equal to a forward voltage of the corresponding rectifier.

* * * * *

UNITED STATES PATENT AND TRADEMARK OFFICE
CERTIFICATE OF CORRECTION

PATENT NO. : 6,366,485 B1
DATED : April 2, 2002
INVENTOR(S) : Teruhiko Fujisawa

It is certified that error appears in the above-identified patent and that said Letters Patent is hereby corrected as shown below:

<u>Column 17,</u>
Line 19, please change "rectifier" to -- rectifiers --

Signed and Sealed this

Fourteenth Day of January, 2003

JAMES E. ROGAN
*Director of the United States Patent and Trademark Office*